US009227165B1

(12) United States Patent
Gedeon-Janvier

(10) Patent No.: US 9,227,165 B1
(45) Date of Patent: Jan. 5, 2016

(54) POT LID APPARATUS INCLUDING AUTOMATIC STIRRER AND VENT CONTROL

(71) Applicant: Maxime Gedeon-Janvier, Inwood, NY (US)

(72) Inventor: Maxime Gedeon-Janvier, Inwood, NY (US)

(*) Notice: Subject to any disclaimer, the term of this patent is extended or adjusted under 35 U.S.C. 154(b) by 431 days.

(21) Appl. No.: 13/888,312

(22) Filed: May 6, 2013

Related U.S. Application Data

(60) Provisional application No. 61/644,461, filed on May 9, 2012.

(51) Int. Cl.
| | |
|---|---|
| *B01F 7/18* | (2006.01) |
| *B01F 15/00* | (2006.01) |
| *A47J 36/06* | (2006.01) |
| *A47J 43/044* | (2006.01) |
| *A47J 37/10* | (2006.01) |
| *A47J 43/07* | (2006.01) |
| *A47J 43/08* | (2006.01) |

(52) U.S. Cl.
CPC ......... *B01F 15/00779* (2013.01); *A47J 43/044* (2013.01); *A47J 36/06* (2013.01); *A47J 37/101* (2013.01); *A47J 43/0711* (2013.01); *A47J 43/082* (2013.01); *B01F 15/00681* (2013.01)

(58) Field of Classification Search
CPC ....... A47J 43/044; A47J 36/06; A47J 37/101; A47J 43/0711; B01F 15/00681; Y10S 220/912
USPC ................ 366/242, 244–252; 220/220, 367.1
See application file for complete search history.

(56) References Cited

U.S. PATENT DOCUMENTS

| | | | | | |
|---|---|---|---|---|---|
| 646,276 | A | * | 3/1900 | Follweiler | 220/231 |
| 655,871 | A | * | 8/1900 | Johnson | 261/32 |
| 661,190 | A | * | 11/1900 | Olson | 220/231 |
| 673,010 | A | * | 4/1901 | Rosenthal | 220/231 |
| 946,271 | A | * | 1/1910 | Reeves | 220/231 |
| 996,916 | A | * | 7/1911 | Fay | 366/197 |
| 4,000,830 | A | * | 1/1977 | French | 220/369 |
| 4,099,512 | A | * | 7/1978 | Noonan | 126/246 |
| 4,285,441 | A | * | 8/1981 | Ziskind | 220/231 |
| 4,613,086 | A | * | 9/1986 | Granum et al. | 241/101.8 |
| 4,708,487 | A | * | 11/1987 | Marshall | 366/206 |
| 4,921,356 | A | * | 5/1990 | Bordenga | 366/343 |
| 5,516,208 | A | * | 5/1996 | Givant | 366/251 |
| 5,711,602 | A | * | 1/1998 | Rohring et al. | 366/251 |
| 5,816,136 | A | * | 10/1998 | Stallings | 99/335 |
| 5,890,804 | A | * | 4/1999 | Edwards et al. | 366/249 |
| 6,006,939 | A | * | 12/1999 | Wai | 220/203.05 |
| 6,105,811 | A | * | 8/2000 | Alfred | 220/369 |
| 6,307,193 | B1 | * | 10/2001 | Toole | 219/735 |
| 7,950,844 | B2 | * | 5/2011 | Murray | 366/251 |
| 2008/0271609 | A1 | | 11/2008 | Pahl et al. | |

(Continued)

*Primary Examiner* — Tony G Soohoo
(74) *Attorney, Agent, or Firm* — Wendy W. Koba

(57) ABSTRACT

A cooking pot lid provides a continuously variable amount of venting (and stirring of ingredients, when desired) and includes a fixed lid component including a plurality of spaced-apart openings, a rotatable shaft disposed through a central aperture of the fixed lid component in a manner such that the rotatable shaft is free to rotate with respect to the fixed lid component; and a rotatable lid component that is attached to the rotatable shaft. The rotatable lid component includes a plurality of spaced-apart fins for alternately covering and exposing the plurality of spaced-apart openings in the fixed lid component to provide the continuously variable venting. Stirring blades may be attached to the rotatable shaft in a manner such that the stirring blades rotate with the shaft.

9 Claims, 4 Drawing Sheets

(56) References Cited

U.S. PATENT DOCUMENTS

| | | | |
|---|---|---|---|
| 2009/0308373 A1* | 12/2009 | Scott et al. | 126/25 R |
| 2011/0048246 A1* | 3/2011 | Chang | 99/348 |
| 2012/0111864 A1* | 5/2012 | Kuzelka | 220/288 |
| 2014/0026766 A1* | 1/2014 | Goff, IV | 99/445 |
| 2015/0090716 A1* | 4/2015 | Wilson | 220/212 |

* cited by examiner

POT LID APPARATUS INCLUDING AUTOMATIC STIRRER AND VENT CONTROL

CROSS-REFERENCE TO RELATED APPLICATIONS

This application claims the benefit of U.S. Provisional Application Ser. No. 61/644,461, filed May 9, 2012 and herein incorporated by reference.

TECHNICAL FIELD

The present invention relates to an improved lid apparatus for cooking pots and, more particularly, to a lid apparatus including an automatic stirrer and vent control arrangement, where the stirrer and vent control may be used in combination or singly, and where the apparatus is capable of being adjusted to be used with pots of various sizes by adapting only one of the components (the fixed cover).

BACKGROUND OF THE INVENTION

Often in cooking, especially in cases where dairy products are involved, one is faced with either the choice of leaving a pot open, or covering it with a lid. If you choose to leave the pot open, it takes longer for the pot to heat up and when it finally does, the liquid ingredients (water or milk, for example) tend to evaporate. This evaporation thus causes waste of some of the ingredients, not to mention loss of some of the aroma. Often, in this case, you need to add more of these liquid ingredients to compensate for the loss.

The other choice is to leave the lid on the pot to prevent evaporation of the liquid ingredients, which preserves the steam/heat and allows the food to cook faster. However, this choice also has major drawbacks. For example, if left unattended—even for a short period of time—the pot can heat too quickly and the contents can boil over (i.e., ebullition of the liquid ingredients)—creating a mess on the cooktop and the pan, and perhaps ruining the food in the pot itself or, at the very least, causing loss of some of the food.

SUMMARY OF THE INVENTION

The needs remaining in the prior art are addressed by the present invention, which relates to an improved lid apparatus for cooking pots and, more particularly, to a lid apparatus including an automatic stirrer and vent control arrangement, where the stirrer and vent control may be used in combination or singly, and where the apparatus is capable of being adjusted to be used with pots of various sizes by adapting only one of the components (the fixed cover).

In accordance with the present invention, a lid apparatus is proposed that includes a mechanized, rotatable vent assembly and a separate automatic stirrer assemblies, both assemblies controlled by the same motor mechanism and coupled to a common central shaft of the motor. The lid apparatus can be battery-operated or energized by an AC power source. A timer mechanism can be included in the apparatus to control the turning "on" and "off" of the motor.

The vent apparatus consists of a number of spaced-apart segments (fins) and the associated fixed cover portion of the lid apparatus includes a number of spaced-apart openings. The vent apparatus is positioned over the fixed cover portion and will rotate with respect to the fixed cover portion such that the vent fins will alternately cover and expose the cover openings (thus, allowing steam and heat to escape from the cooking pot in a controlled fashion). Attaching a stirring apparatus to the same central shaft as used to control the rotation of the vent apparatus allows for the contents to be continuously stirred, preventing burning, boil-over and the like.

In accordance with one embodiment of the present invention, a cooking pot lid is configured to provide a continuously variable amount of venting (and stirring of ingredients, when desired) and includes a fixed lid component including a plurality of spaced-apart openings, a rotatable shaft disposed through a central aperture of the fixed lid component in a manner such that the rotatable shaft is free to rotate with respect to the fixed lid component; and a rotatable vent component that is attached to the rotatable shaft. The rotatable vent component includes a plurality of spaced-apart fins for alternately covering and exposing the plurality of spaced-apart openings in the fixed lid component to provide the continuously variable venting. Stirring blades may be attached to the rotatable shaft in a manner such that the stirring blades rotate with the shaft. The rotatable vent component may be removably attached to the motor shaft (such as by using an engaging clip, for example) allowing for the stirring to continue while keeping the vent component in a stationary position.

Other and further aspects and features of the present invention will become apparent during the course of the following discussion and by reference to the accompanying drawings.

BRIEF DESCRIPTION OF THE DRAWINGS

Referring now to the drawings, where the same reference numerals represent the same parts in several views.

DETAILED DESCRIPTION

The lid apparatus of the present invention was conceived to prevent, or at least diminish, the possibility of facing cooking disasters associated with leaving a lid on a pot as the ingredients are beginning to cook. As will be discussed in detail below, the inventive lid apparatus comprises a unique two-part cover that allows for a portion of heat/steam to escape the pot, and which may be used in combination with an automatic stirrer that prevents settling and/or burning of the ingredients. The two-part cover allows just enough heat/steam to escape to prevent ebullition, and at the same time the automatic stirrer keeps the ingredients in motion to provide them from settling at the bottom of the pot and perhaps burning.

While it is obvious that the inventive apparatus provides these functional advantages, it is to be noted that the apparatus also creates utility cost savings since the food will cook faster, not to mention time savings by not having to worry about over-boiling pots and cleaning up the mess associated with boilovers.

Figure 1:
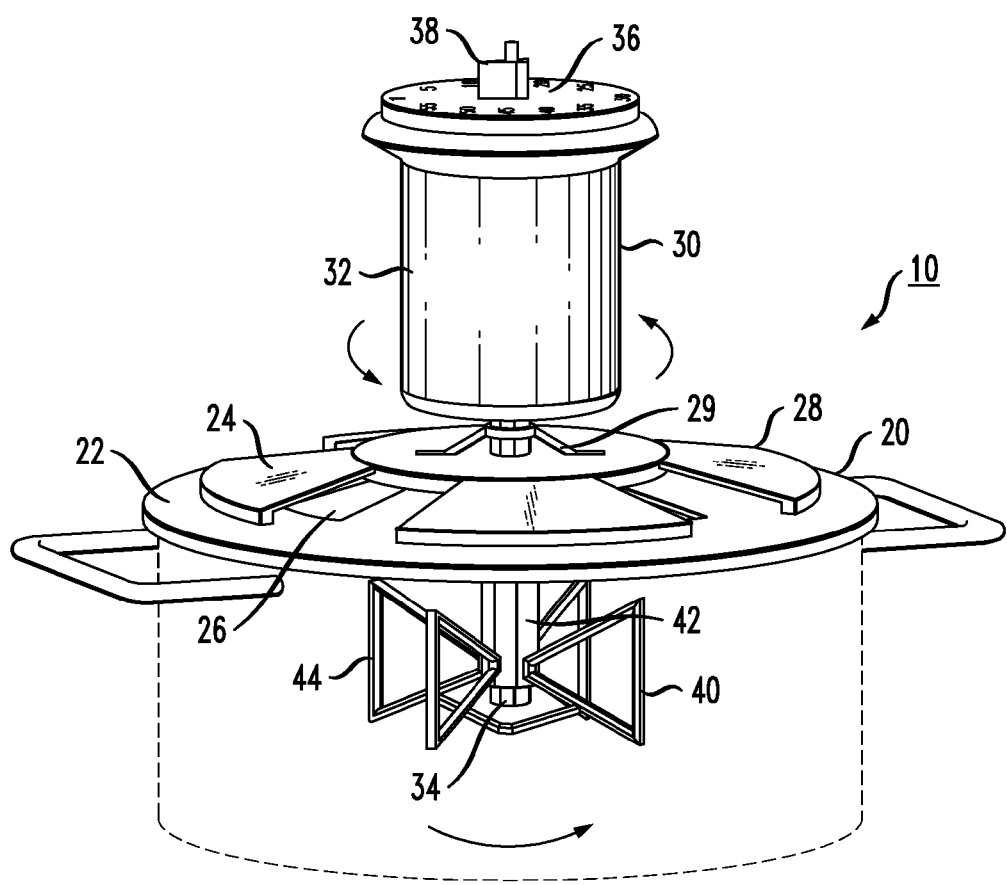
FIG. 1 illustrates an exemplary lid apparatus formed in accordance with the present invention.
Figure 2:
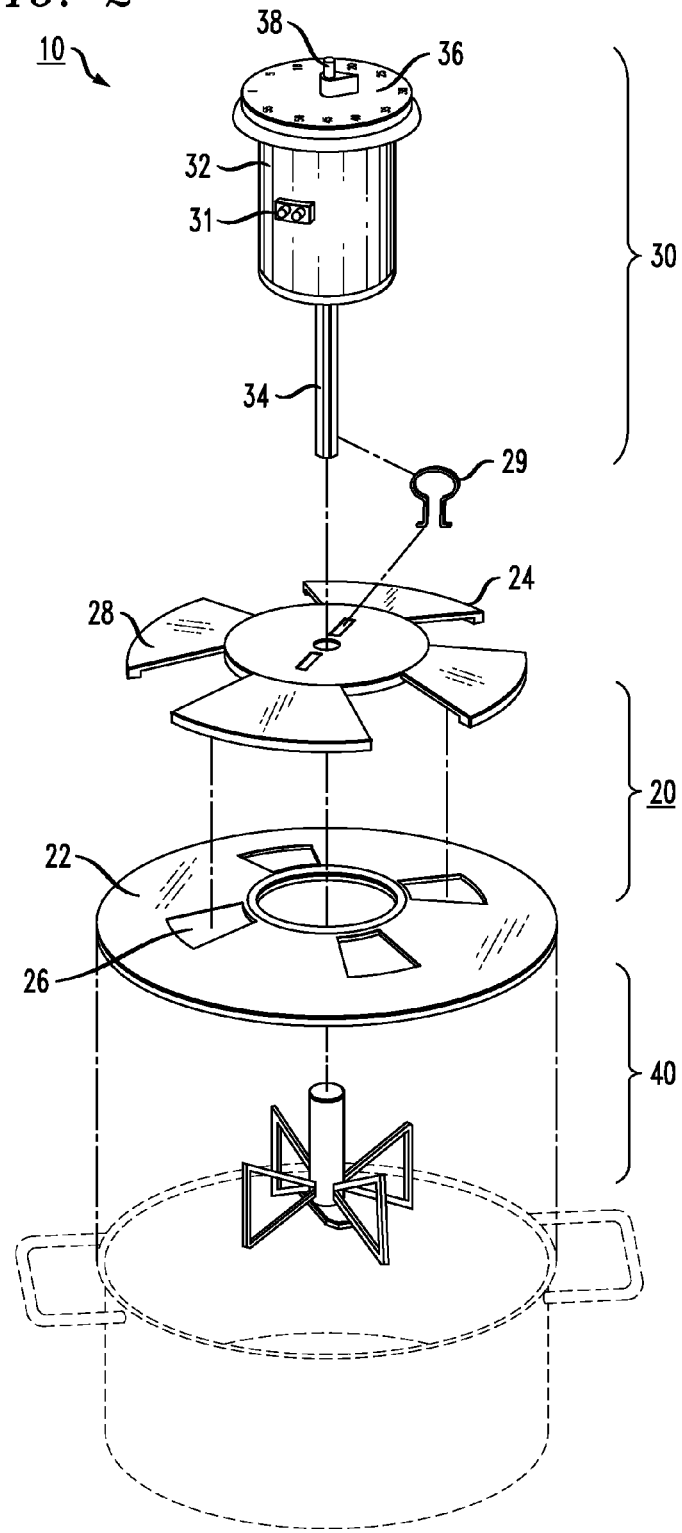
FIG. 2 is an exploded view of the exemplary lid apparatus of FIG. 1.

FIG. 1 illustrates an exemplary lid apparatus 10 formed in accordance with the present invention, with an exploded view shown in FIG. 2. Lid apparatus 10 includes three major assemblies: a cover assembly 20, a motor assembly 30 and a stirring assembly 40. Cover assembly 20 contains at least two components, a fixed cover 22 and a rotating vent apparatus 24. As best shown in the exploded view of FIG. 2, fixed cover 22 includes a plurality of openings 26 and rotating vent apparatus 24 is formed of a like plurality of spaced-apart segments 28 (hereinafter referred to fins 28). As vent apparatus 24 rotates with respect to fixed cover 22 (shown by arrows in FIG. 1), fins 28 will alternately cover and expose openings 26, allowing for a portion of any heat/steam to escape as the cover rotates. In one embodiment, therefore, the number of fins and their dimensions are determined so that when aligned over openings 26, the openings are fully concealed. The movement of vent apparatus 24 with respect to fixed cover 22 will be described in more in detail herein below in association with FIGS. 4 and 5.

In one embodiment of the present invention, cover assembly 20 further comprises an engaging clip 29 that is used in the manner described below to removably attach rotating vent apparatus 24 to motor assembly 30. While the specific illustration as shown in FIGS. 1 and 2 comprises an engaging clip, various other arrangements of removably coupling rotating vent apparatus 24 to motor assembly 30 may be used and are considered to fall within the spirit and scope of the present invention.

Figure 3:
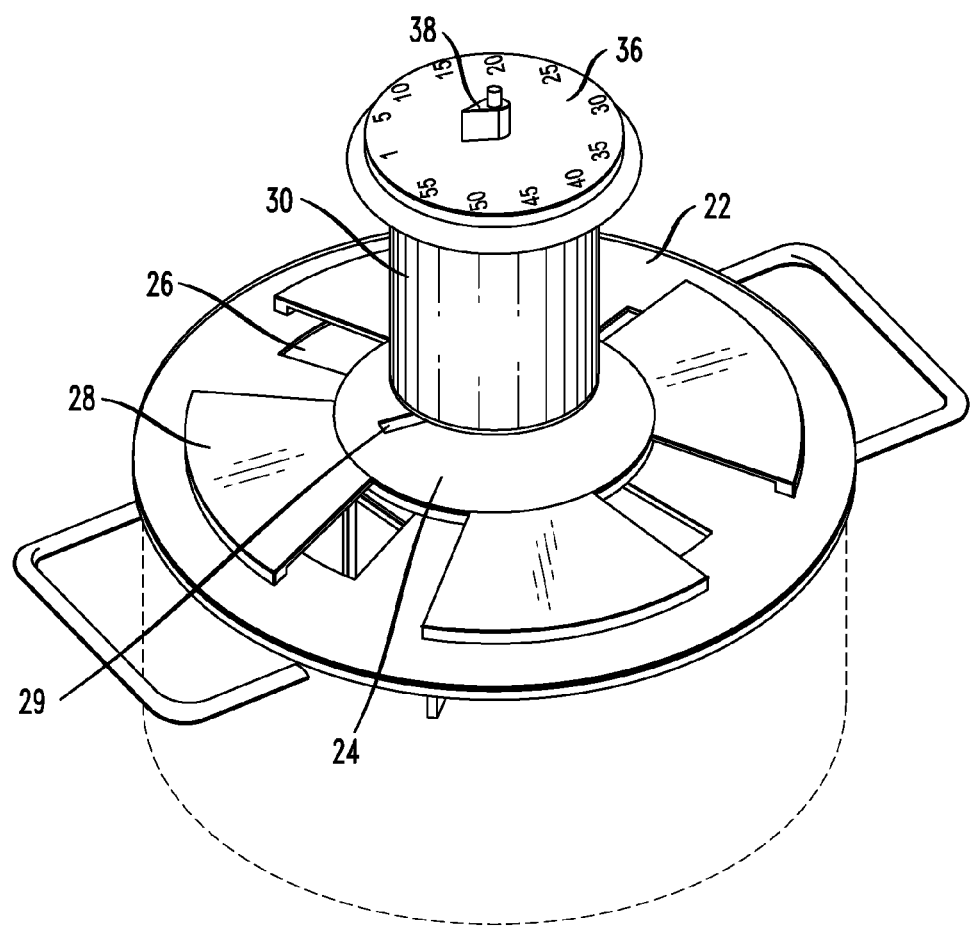
FIG. 3 is an isometric view of the exemplary lid apparatus of FIG. 1.

Obviously, the rate of rotation of vent apparatus 24 will control the amount of steam that escapes, as will the size of openings 26 and fins 28. It is to be understood that various combinations of dimensions may be used and all are considered to fall within the scope of the present invention. As mentioned above, rotating vent apparatus 24 may be disengaged from motor assembly 30 and allow to remain "fixed" in place, as desired. For example, removing engaging clip 29 from the assembly will disengage vent apparatus 24 from motor assembly 30. When not rotating, vent apparatus 24 may be positioned to either have a pot completely covered or have some portions of openings 26 exposed, as desired. The isometric view of FIG. 3 illustrates an exemplary relationship between fixed cover 22 and rotating vent apparatus 24, with portions of openings 26 exposed as a function of the location of fins 28.

Motor assembly 30, as shown best in FIG. 2, comprises a motor unit 32, a shaft 34 and, preferably, a timer 36. It is to be understood that motor unit 32 can be battery-driven, or driven by an AC source, similar to other kitchen appliances. A single-speed or multi-speed motor may be used. As shown in FIGS. 1 and 2, motor assembly 30 is mounted over rotating vent apparatus 24, with shaft 34 passing through fixed cover 22 so as to extend downward into an associated pot (the pot shown in phantom in the drawings). Engaging clip 29 is positioned to surround shaft 34 and then couple to rotating vent apparatus 24 so as to removably attach vent apparatus 24 to motor assembly 30. When motor unit 32 is activated, shaft 34 will rotate. By including a timer, the operation of motor unit 32 can be controlled to be turned "on" for a predetermined period of time (minutes in this case, as controlled by a knob 38). FIG. 3 is an isometric view of apparatus 10, illustrating one exemplary embodiment of a timer 36 as formed as part of motor assembly 30. Otherwise, if a timer is not included, the user can simply turn assembly 30 "on" and "off" as desired (as controlled by switch 31 shown in FIG. 2).

In accordance with the present invention, vent apparatus 24 is connected to shaft 34 (perhaps removably attached) and will, therefore, rotate around mixed cover 22 as shaft 34 rotates. The constant rotation of vent apparatus 24 will result in a continuous change in the coverage of openings 26 by fins 28, thus allowing for heat and steam to escape through openings 26 during the periods of time that they are not covered by fins 28. Obviously, the speed of rotation of vent apparatus 24 (as controlled by motor unit 32) will control the amount of steam and heat that is released. Indeed, it is possible in one embodiment of the present invention to use a multi-speed motor that will control both the rotation of vent apparatus 24 with respect to fixed cover 22 and the movement of the stirring apparatus as described below.

Stirring assembly 40 is shown in FIGS. 1 and 2 as including a center sleeve 42 and blades 44. Center sleeve 42 fits over and is attached to shaft 34 of motor assembly 30. Therefore, when shaft 34 rotates, blades 44 of stirring assembly 40 will rotate and stir the ingredients in the pot. Blades 44 may be of any suitable number and geometry; indeed different blade configurations may be used for different situations, depending on the ingredients.

Figure 4:
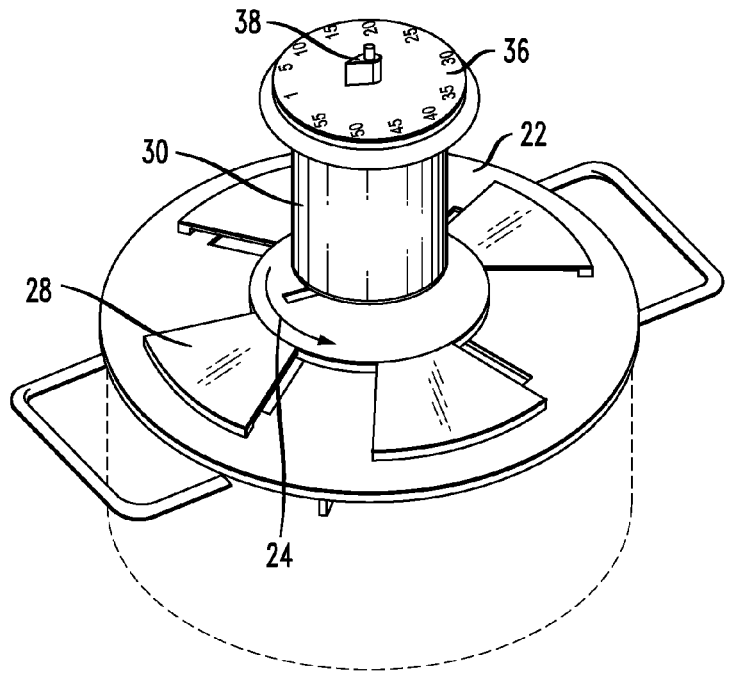
FIG. 4 is an alternative configuration of the view of FIG. 3, illustrating the movement of the vent apparatus with respect to the openings on the fixed cover portion.
Figure 5:
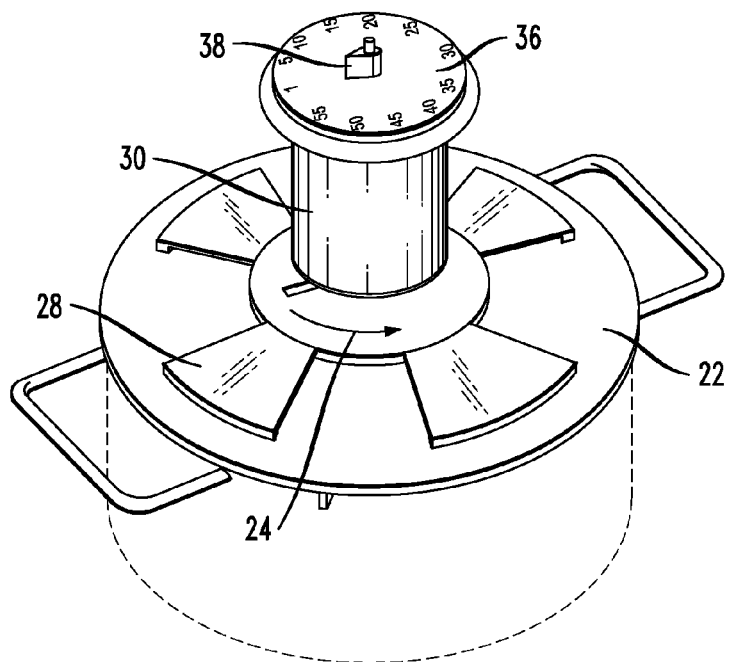
FIG. 5 is yet another configuration of the view of FIG. 3, illustrating further movement of the vent apparatus with respect to the openings on the fixed cover portion.

FIGS. 4 and 5, when viewed with FIG. 3, illustrate the change in coverage of openings 26 as vent apparatus 24 rotates with respect to fixed cover 22. FIG. 3 illustrates a point in time where openings 26 are largely exposed, allowing for a large volume of steam and heat to escape the pot. In the arrangement as shown in FIG. 4, vent apparatus 24 as rotated (as shown by the arrow) such that fins 28 cover a majority of openings 26, allowing for only a relatively small stream of steam and heat to escape. As vent apparatus 24 continues to rotate, the positioning as shown in FIG. 5 will occur, where fins 28 completely cover openings 26, trapping the steam and heat within the pot. As vent apparatus 24 continues to rotate, therefore, this continuous change between "open", "partially open" and "closed" will continue, as controlled by the rate of rotation of shaft 34.

It is to be understood that the lid apparatus of the present invention may be utilized with the rotating cover dis-engaged from the motor assembly, providing automatic stirring while allowing for a fixed amount of heat/steam to escape. In one exemplary arrangement of the present invention, a coupling arrangement for removably connecting the rotating vent apparatus from the draft shaft of the motor. It is also possible to remove the automatic stirrer portion and allow for the rotating cover to be used to control steam release from a pot. Moreover, the apparatus of the present invention is not exclusively designed to work on specific cookware by merely changing the size of the fixed cover for a given pot size.

Indeed, while the invention is described by reference to a specific preferred embodiment, it is clear that variations can be made without departing from the spirit of the invention as defined by the claims appended hereto.

What is claimed is:
1. A cooking pot lid comprising:
a fixed lid component including a plurality of spaced-apart openings;
a rotatable shaft disposed through a central aperture of the fixed lid component in a manner such that the rotatable shaft is free to rotate with respect to the fixed lid component;
a rotatable vent apparatus attached to the rotatable shaft, the rotatable vent apparatus including a plurality of spaced-apart fins for alternately covering and exposing the plurality of spaced-apart openings in the fixed lid component to provide continuous venting;
stirring blades attached to the rotatable shaft in a manner such that the stirring blades rotate with the shaft; and
a motor coupled to the rotatable shaft to impart rotational motion thereto.

2. A cooking pot lid as defined in claim 1 wherein the rotatable vent apparatus is configured to be disengaged from the rotatable shaft and provide a fixed amount of venting.

3. A cooking pot lid as defined in claim 2 wherein the cooking pot lid further comprises an engagement clip for removably attaching the rotatable vent apparatus to the shaft.

4. A cooking pot lid as defined in claim 1 wherein the stirring blades are removably attached to the rotatable shaft.

5. A cooking pot lid as defined in claim 1 wherein the motor is a single-speed motor.

6. A cooking pot lid as defined in claim 1 wherein the motor is a variable-speed motor.

7. A cooking pot lid as defined in claim 1 wherein the motor is a battery-operated motor.

8. A cooking pot lid as defined in claim 1 wherein the motor is an AC-controlled motor.

9. A cooking pot lid as defined in claim 1 wherein the lid further comprises a timing mechanism coupled to the motor for controlling the turning "on" and "off" of the rotatable shaft.

\* \* \* \* \*